(No Model.)
G. GOODYEAR, Jr. & J. B. PLUM.
HANGER FOR CLOTHES LINES.
No. 435,625. Patented Sept. 2, 1890.
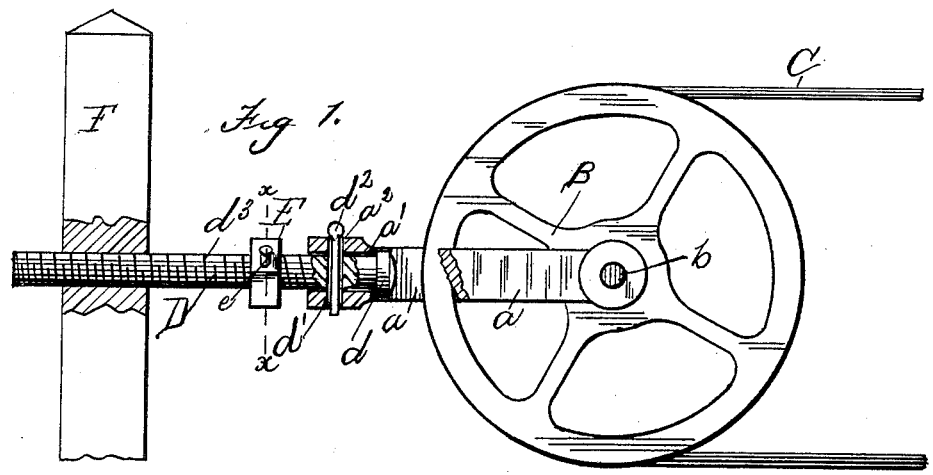
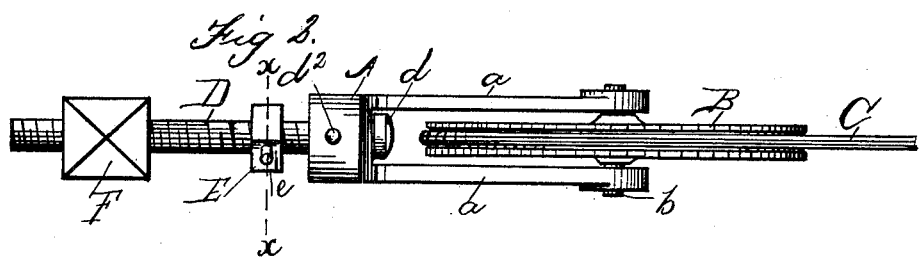
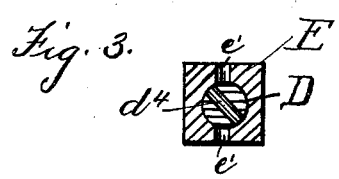
Witnesses
Vernon M. Dorsey
J. W. Nichol
Inventors
G. Goodyear, Jr.
J. B. Plum
By their Attorney
J. B. Lawyer

UNITED STATES PATENT OFFICE.

GEORGE GOODYEAR, JR., AND JACOB B. PLUM, OF RAVENNA, OHIO.

HANGER FOR CLOTHES-LINES.

SPECIFICATION forming part of Letters Patent No. 435,625, dated September 2, 1890.

Application filed May 6, 1890. Serial No. 350,827. (No model.)

*To all whom it may concern:*

Be it known that we, GEORGE GOODYEAR, Jr., and JACOB B. PLUM, citizens of the United States, residing at Ravenna, in the county of Portage and State of Ohio, have invented certain new and useful Improvements in Hangers for Clothes-Lines; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to hangers for endless clothes-lines; and it has for its object to provide means whereby the position of the hanger may be varied, thus keeping the line taut without twisting the latter; and for this purpose it consists of a pulley having the head of a bolt journaled in its rear part, whereby the one may be rotated without turning the other, the said screw having a nut thereon, the said bolt being locked in position in relation to the pulley and the nut in relation to the bolt by means of pins projecting through holes in the said parts, as will be hereinafter more fully described and claimed.

Referring to the accompanying drawings, in which corresponding parts are designated by corresponding letters, Figure 1 is a side view of my invention, the rear end of one of the prongs being broken away. Fig. 2 is a top view thereof. Fig. 3 is a cross-section on lines $x$ $x$ of Figs. 1 and 2.

The pulley-frame A has forwardly-projecting prongs $a$, between which at their forward ends the pulley proper B is mounted on the bolt $b$, which is removable, permitting the pulley B to be removed from between the prongs $a$ for the insertion of the bolt D or line C, the latter of which is continuous or endless and encircles the pulley, as shown.

The screw-bolt D passes through a hole $a'$ in the rear of the pulley-frame, the head $d$ of the bolt resting between the prongs $a$ and bearing on the forward face of the frame, the bolt being inserted from the front while the pulley proper B is removed from between the prongs. The bolt D fits loosely within the hole $a'$, being capable of rotation therein, although, as in some cases it may be desired to use the pulley-frame as a handle for rotating the bolt, we cut holes $d'$ and $a^2$ in the bolt and frame, respectively, into which, when they are caused to register with each other by rotation, a pin $d^2$ may be inserted, locking the frame and bolt together.

Upon the rear end of the bolt D is a screw-thread $d^3$, upon which the nut E works, the nut being adapted to be locked thereon by a pin $e$ inserted in the hole $e'$ in the nut and in a corresponding hole $d^4$ in the bolt.

In the use of our invention the bolt D will be screwed into some fixed support—such as a post F, as shown—using the frame A as a handle. The rope C will then be passed around the pulley B and around a similar or any other suitable hanger at a distance and be drawn as tight as may be conveniently done. If any slack remains or if any is subsequently caused by a stretching of the rope, &c., the pin $d^2$ is withdrawn and the bolt rotated by means of the nut E, causing it to enter the support for the desired distance, thus taking up the slack, and it will be noticed in this connection that as the pin $d^2$ is withdrawn no rotary motion will be imparted to the pulley-frame or pulley proper, thus preventing the twisting of the rope which would otherwise occur.

Having thus described our invention, what we desire to secure by Letters Patent of the United States is—

In a clothes-line hanger, the combination, with a pulley-frame, of a pulley mounted in the forward end thereof, a bolt pivotally mounted in the said frame and projecting from the rear end thereof, holes in the said frame and bolt registering with each other, a pin contained in the said holes, a nut mounted on the said bolt, the said bolt and nut having corresponding holes therein, and a pin contained within the holes in the nut and bolt, as described.

In testimony whereof we affix our signatures in presence of two witnesses.

GEORGE GOODYEAR, JR.
JACOB B. PLUM.

Witnesses:
S. F. HANSELMAN,
CHARLES H. DURHAM.